US008533478B2

(12) United States Patent
Aguilera et al.

(10) Patent No.: US 8,533,478 B2
(45) Date of Patent: Sep. 10, 2013

(54) SYSTEM FOR AND METHOD OF WRITING AND READING REDUNDANT DATA

(75) Inventors: Marcos K. Aguilera, Mountain View, CA (US); Ram Swaminathan, Cupertino, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 552 days.

(21) Appl. No.: 12/258,273

(22) Filed: Oct. 24, 2008

(65) Prior Publication Data

US 2010/0106974 A1 Apr. 29, 2010

(51) Int. Cl.
*H04L 29/06* (2006.01)
*H04L 9/32* (2006.01)

(52) U.S. Cl.
CPC ............ *H04L 9/3281* (2013.01); *H04L 9/3294* (2013.01)
USPC ............................ 713/176; 713/178; 726/30

(58) Field of Classification Search
USPC ....... 713/176, 178; 726/26, 27, 30; 711/111, 711/112, 113, 114; 714/6, 7
See application file for complete search history.

(56) References Cited

U.S. PATENT DOCUMENTS

| | | | |
|---|---|---|---|
| 6,351,811 B1 * | 2/2002 | Groshon et al. ............... | 713/176 |
| 6,671,821 B1 * | 12/2003 | Castro et al. .................... | 714/4.3 |
| 6,850,969 B2 * | 2/2005 | Ladan-Mozes et al. ....... | 709/213 |
| 6,950,833 B2 * | 9/2005 | Costello et al. ........................ | 1/1 |
| 6,957,331 B2 * | 10/2005 | Kursawe et al. .............. | 713/163 |
| 7,139,891 B1 * | 11/2006 | Apvrille et al. ................ | 711/163 |
| 7,152,077 B2 | 12/2006 | Veitch et al. | |
| 7,310,703 B2 | 12/2007 | Frolund et al. | |
| 7,536,400 B2 * | 5/2009 | Pasumansky et al. ................. | 1/1 |
| 7,546,412 B2 * | 6/2009 | Ahmad et al. ................. | 711/112 |
| 7,634,280 B2 * | 12/2009 | Modeo ........................... | 455/466 |
| 7,640,582 B2 * | 12/2009 | Beck ............................... | 726/21 |
| 7,657,751 B2 * | 2/2010 | Micali et al. ................... | 713/176 |
| 7,801,871 B2 * | 9/2010 | Gosnell .......................... | 707/698 |
| 7,930,493 B1 * | 4/2011 | McGovern et al. ............ | 711/159 |
| 7,996,679 B2 * | 8/2011 | Hsu et al. ....................... | 713/176 |
| 8,001,104 B2 * | 8/2011 | Frondozo et al. ............. | 707/706 |
| 8,276,191 B2 * | 9/2012 | Paul et al. .......................... | 726/4 |
| 2002/0023220 A1 * | 2/2002 | Kaplan ........................... | 713/176 |
| 2002/0116611 A1 * | 8/2002 | Zhou et al. ..................... | 713/156 |

(Continued)

OTHER PUBLICATIONS

Martin, Jean-Philippe; Alvisi, Lorenzo; "A Framework for Dynamic Byzantine Storage", International Conference on Dependable Systems and Networks, Jun. 28-Jul. 1, 2004, pp. 325-334.*

(Continued)

*Primary Examiner* — Catherine Thiaw
*Assistant Examiner* — Victor Lesniewski

(57) ABSTRACT

In accordance with an embodiment of the invention, a method of writing and reading redundant data is provided. Data is written by storing a copy of the data along with a timestamp and a signature at each of a set of storage devices. The data is read by retrieving the copy of the data, the timestamp and the signature from each of a plurality of the set of data storage devices. One of the copies of the data is selected to be provided to a requestor of the data. Each of the storage devices of the set is requested to certify the selected copy of the data. Provided that a proof of certification of the selected copy of the data is valid, the storage devices of the set are instructed to store the selected copy of the data along with a new timestamp.

19 Claims, 10 Drawing Sheets

(56) References Cited

U.S. PATENT DOCUMENTS

| | | | | |
|---|---|---|---|---|
| 2003/0126446 | A1* | 7/2003 | Debiez et al. | 713/178 |
| 2006/0224846 | A1* | 10/2006 | Amarendran et al. | 711/162 |
| 2007/0079126 | A1* | 4/2007 | Hsu et al. | 713/176 |
| 2007/0220259 | A1* | 9/2007 | Pavlicic | 713/176 |
| 2008/0228834 | A1* | 9/2008 | Burchall et al. | 707/202 |

OTHER PUBLICATIONS

Bazzi, Rida A.; Ding, Yin; "Bounded Wait-Free f-Resilient Atomic Byzantine Data Storage Systems for an Unbounded Number of Clients", Distributed Computing, Lecture Notes in Computer Science, vol. 4167, 2006, pp. 299-313.*

Dutta, Partha; Guerraoui, Rachid; Levy, Ron R.; "Optimistic Erasure-Coded Distributed Storage", Proceedings of the $22^{nd}$ International Symposium on Distributed Computing, 2008, pp. 182-196.*

Idit Abraham, Gregory Chockler, Idit Keidar, and Dahlia Malkhi. Wait-free regular storage from byzantine components. Information Processing Letters, 101(2):60-65, Jan. 2007.

M. K. Aguilera, et al., Abortable and query-abortable objects and their effecient implementation, in Proc. of the 26th Symp. on Principles of Dist. Comp., pp. 7-19, Aug. 2007.

A.S. Aiyer, et al., Bounded wait free implementation of optimally resilient byzantine storage without (unprovane) cryptographic assumptions, Proc. of the 21st Int'l. Symp. on Distributed Computing, pp. 7-19, Sep. 2007.

Hagit Attiya and Amir Bar-Or, Sharing memory with semi-byzantine clients and faulty storage servers, Parallel Processing Letters, 16(4):419-428, Dec. 2006.

Christian Cachin and Stefano Tessaro, Optimal resilience for erasure-coded byzantine distributed storage, Technical Report RZ 3575, IBM Research—Zurich, Feb. 6, 2005.

Miguel Castro, Practical byzantine fault tolerance, Technical Report MIT/LCS/TR-817, MIT LCS, Jan. 2001.

M. Castro and B. Liskov. Authenticated byzantine fault tolerance without public-key cryptography. Technical Report MIT/LCS/TM-589, MIT Laboratory for Computer Science, Jun. 1999.

J. Cowling, D. Meyers, B. Liskov, R. Rodrigues, and L. Shrira. HQ replication: A hybrid quorum protocol for byzantine fault tolerance. In Proceedings of OSDI, Dec. 2006.

Michael J. Fischer, Nancy A. Lynch, and Michael S. Paterson. Impossibility of distributed consensus with one faulty process. Journal of the ACM, 32(2):374-382, Apr. 1985.

S. Frolund, et al., A decentralized algorithm for erasure-coded virtual disks. In Proc. of the Int'l Conf. on Dependable Systems and Networks (DSN 2004), pp. 125-134, Jun. 2004.

G. Goodson, J. Wylie, G. Ganger, and M. Reiter, Efficient byzantine-tolerant erasure-coded storage, In In Proc. of Int'l. Conf. on Dependable Systems, Jun. 2004.

D. Hendler and N. Shavit, Operation-valency and the cost of coordination, In Proc. of the 24th Annual Symp. on Principles of Distributed Computing, pp. 84-91, Jul. 2003.

M. Herlihy and J. Wing, Linearizability: a correctness condition for concurrent objects, ACM Transactions on Programming Languages and Systems, 12(3):463-492, Jul. 1990.

R. Kotla, L. Alvisi, M. Dahlin, A. Clement, and E. Wong, Zyzzyva: Speculative byzantine fault tolerance, In Proc. of SOSP, Oct. 2007.

D. Malkhi and M. Reiter, Secure and scalable replication in phalanx. In Proc. of 17th IEEE Symposium on Reliable Distributed Systems, Oct. 1998.

J. Martin, L. Alvisi, and M. Dahlin, Minimal byzantine storage, In Proc. of 16th Int'l Symp. on Distributed Computing, pp. 311-326, Oct. 2002.

Y. Saito, et al., FAB: building reliable enterprise storage systems on a shoestring, In Proc. of the 9th Workshop on Hot Topics in Operating Systems, pp. 169-174, May 2003.

Y. Saito, et al., FAB: building distributed enterprise disk arrays from commodity components, In Proc. of the 11th Int'l. Conf. on Architectural support for programming languages and operating systems (ASPLOS 2004), pp. 48-58, Oct. 2004.

* cited by examiner

Code for client process p:

procedure write(v)
  T' ← newTimestamp()
  repeat forever
    c ← current-server
    send ⟨WRITE, v, T, S_client(WRITE, v, T')⟩ to c
    wait for reply or c ≠ current-server
    if got reply of the form ⟨⊥, T''⟩ with T''>T'
      and chkStamp(T'') then return ⊥
    if got reply of the form ⟨ok, stoproof⟩
      with chkStoProof(v, T, stoproof) then return ok procedure newTimestamp()
  t ← ⟨clock(), p⟩; return ⟨TIMESTAMP, t, S_client(⟨TIMESTAMP, t⟩)⟩ procedure read()
  repeat forever
    T ← newTimestamp()
    c ← current-server
    send ⟨READ, T, S_client(READ, T, c)⟩ to c
    wait for reply or c ≠ current-server
    if got reply of the form ⟨⊥, T''⟩ with T'' > T
      and chkStamp(T'') then return ⊥
    if got reply of the form ⟨ok, v, stoproof⟩ with
      chkStoProof(v, T, stoproof) then return ⟨ok, v⟩

Code for server process $p$:

Initialization
  $Tread, Tcert, Twrite$ : init-timestamp
  $ClWSig$ : init-sig, $ValProof$ : $\emptyset$, $Val$ : init-value upon receive $\langle \text{WRITE}, v, T, clWsig \rangle$ from client
  send $\langle \text{STORE}, v, T, clWsig, \emptyset \rangle$ to all servers
  wait for replies from $n - f$ servers $q$ of the form
    (A) $\langle \bot, T' \rangle$ with $T'' > T$ and $chkStamp(T'')$ or
    (B) $\langle \textbf{ok}, sSig_q \rangle$ with $\mathcal{V}_q(sSig_q, \langle \text{ACK-STO}, v, T \rangle)$
  if some reply of form (A) then return $\langle \bot, T'' \rangle$
    $stoproof \leftarrow \{\langle q, sSig_q \rangle\}$ from the replies of form (B) $\}$
  return $\langle \textbf{ok}, stoproof \rangle$ upon receive $\langle \text{STORE}, v, T, clWsig, valproof \rangle$ from $c$
  if not $chkProof(v, T, clWsig, valproof)$ then return fail
  if $T < \max\{Tread, Twrite\}$ then return $\langle \bot, \max\{Tread, Twrite\} \rangle$
    $\langle Tread, Twrite, Val, ClWSig, ValProof \rangle \leftarrow \langle T, T, v, clWsig, valproof \rangle$
  return $\langle \textbf{ok}, \mathcal{S}_p(\text{ACK-STO}, v, T) \rangle$ upon receive $\langle \text{READ}, T, clRsig \rangle$ from client
  send $\langle \text{QUERY}, T, clRsig \rangle$ to all servers
  wait for replies from $n - f$ servers $q$ of the form
    (A) $\langle \bot, T' \rangle$ with $T'' > T$ and $chkStamp(T'')$ or
    (B) $\langle \textbf{ok}, v_q, T_q; clWsig_q, valproof_q, bindSig_q \rangle$
    with $chkProof(v_q, T_q, clWsig_q, valproof_q)$ and
    $T > T_q$ and $\mathcal{V}_q(bindSig_q, \langle \text{BIND}, T, T_q \rangle)$
  if some reply of form (A) then return $\langle \bot, T'' \rangle$
    $maxproof \leftarrow \{\langle T_q, bindSig_q, q \rangle\}$ from the replies of form (B) $\}$
    $\langle T^*, v^*, cs^*, vp^* \rangle \leftarrow$ largest $T_q$ and
                            associated $v_q, clWsig_q, valproof_q$
  send $\langle \text{CERTIFY}, T, T^*, v^*, cs^*, vp^*, maxproof, clRsig \rangle$
    to all servers
  wait for replies from $n - f$ servers $q$ of the form
    (A) $\langle \bot, T' \rangle$ with $T'' > T$ and $chkStamp(T'')$ or
    (B) $\langle \textbf{ok}, vSig_q \rangle$ with $\mathcal{V}_q(vSig_q, \langle \text{ACK-VAL}, v^*, T \rangle)$
  if some reply of form (A) then return $\langle \bot, T'' \rangle$
    $valproof \leftarrow \{\langle q, vSig_q \rangle\}$ from the replies of form (B) $\}$
  send $\langle \text{STORE}, v^*, T, \emptyset, valproof \rangle$ to all servers
  wait for replies from $n - f$ servers $q$ of the form
    (A) $\langle \bot, T' \rangle$ with $T'' > T$ and $chkStamp(T'')$ or
    (B) $\langle \textbf{ok}, sSig_q \rangle$ with $\mathcal{V}_q(sSig_q, \langle \text{ACK-STO}, v^*, T \rangle)$
  if some reply of form (A) then return $\langle \bot, T'' \rangle$
    $stoproof \leftarrow \{\langle q, sSig_q \rangle\}$ from the replies of form (B) $\}$
  return $\langle \textbf{ok}, v^*, stoproof \rangle$ upon receive $\langle \text{QUERY}, T, clRsig \rangle$ from $c$
  if not $chkStamp(T)$ or
     not $\mathcal{V}_{client}(clRsig, \langle \text{READ}, T, c \rangle)$ or $Tread = T$
  then return fail
  if $T < \max\{Tread, Twrite\}$ then return $\langle \bot, \max\{Tread, Twrite\} \rangle$
    $Tread \leftarrow T$
  return $\langle \textbf{ok}, Val, Twrite, ClWSig, ValProof, \mathcal{S}_p(\text{BIND}, T, Twrite) \rangle$ upon receive $\langle \text{CERTIFY}, T, T^*, v^*, cs^*, vp^*, maxproof, clRsig \rangle$ from $c$
  if not $chkMaxProof(v^*, T, T^*, maxproof)$ or
     not $\mathcal{V}_{client}(clRsig, \langle \text{READ}, T, p_c \rangle)$ or $T' = T_{cert}$
  then return fail
  if $T < \max\{Tread, Twrite, Tcert\}$
  then return $\langle \bot, \max\{Tread, Twrite, Tcert\} \rangle$
    $\langle Tread, Tcert \rangle \leftarrow \langle T, T \rangle$
  return $\langle \textbf{ok}, \mathcal{S}_p(\text{ACK-VAL}, v^*, T) \rangle$

FIG. 5C $chkStamp(T) \equiv [T \text{ is of form } \langle \text{TIMESTAMP}, k, sign\rangle \wedge \mathcal{V}_{client}(sign, \langle \text{TIMESTAMP}, k\rangle)]$ $chkStoProof(v, T, stoproof) \equiv [\exists Q \subset \Pi^s : |Q| = n - f \wedge stoproof = \cup_{q \in Q} \langle q, sSig_q\rangle \text{ with } \mathcal{V}_q(sSig_q, \langle \text{ACK-STO}, v, T\rangle)]$ $chkValProof(v, T, valproof) \equiv [\exists Q \subset \Pi_s : |Q| = n - f \wedge valproof = \cup_{q \in Q} \langle q, vSig_q\rangle \text{ with } \mathcal{V}_q(vSig_q, \langle \text{ACK-VAL}, v, T\rangle)]$ $chkProof(v, T, cliWsig, valproof) \equiv [(cliWsig \neq \emptyset \wedge \mathcal{V}_{client}(cliWsig, \langle \text{WRITE}, v, T\rangle)) \vee$
$(valproof \neq \emptyset \wedge chkValProof(v, T, valproof))]$ $chkMaxProof(T, T^*, maxproof) \equiv [\exists Q \subset \Pi^s : |Q| = n - f \wedge \big(maxproof = \cup_{q \in Q} \langle T_q, bindSig_q, q\rangle \text{ with } T > T_q \wedge$
$\mathcal{V}_q(bindSig_q, \langle \text{BIND}, T, T_q\rangle)\big) \wedge T^* = \max_{x_q \in Q} T_q]$

| FIG. 5A |
| FIG. 5B |
| FIG. 5C |

FIG. 5

Code for client process $p$:

procedure $write(v)$
  $T \leftarrow newTimestamp(\text{W-TIME})$
  repeat forever
    $c \leftarrow current\text{-}server$
    send $\langle \text{WRITE}, v, T, S_{client}(\langle \text{WRITE}, v, T \rangle) \rangle$ to $c$
    wait for reply or $c \neq current\text{-}server$
    if got reply of the form $\langle \perp, T'' \rangle$ with $T'' > T$
      and $chkStamp(T'')$ then return $\perp$
    if got reply of the form $\langle \text{ok}, stoproof \rangle$
      with $chkStoProof(v, T, stoproof)$ then return ok procedure $newTimestamp(tag)$
  $t \leftarrow \langle clock(), p \rangle$; return $\langle tag, t, S_{client}(\langle tag, t \rangle) \rangle$ procedure $read()$
  repeat forever
    $T \leftarrow newTimestamp(\text{R-TIME})$
    $c \leftarrow current\text{-}server$
    send $\langle \text{READ}, T, S_{client}(\langle \text{READ}, T, c \rangle) \rangle$ to $c$
    wait for reply or $c \neq current\text{-}server$
    if got reply of the form $\langle \perp, T'' \rangle$ with $T'' > T$
      and $chkStamp(T'')$ then return $\perp$
    if got reply of the form $\langle \text{ok}, v, stoproof \rangle$ with
      $chkStoProof(v, T, stoproof)$ then return $\langle \text{ok}, v \rangle$

```
Code for server process p:

upon receive ⟨WRITE, v, T, cliWsig⟩ from client
  send ⟨STORE, v, T, T, cliWsig, ∅⟩ to all servers
  wait for replies from n − f servers q of the form
    (A) ⟨⊥, T'⟩ with T' > T and chkStamp(T') or
    (B) ⟨ok, sSig_q⟩ with V_q (sSig_q, ⟨ACK-STO, v, T⟩)
  if some reply of form (A) then return ⟨⊥, T'⟩
  stoproof ← {⟨q, sSig_q⟩} from the replies of form (B) }
  return ⟨ok, stoproof⟩ upon receive ⟨READ, T, cliRsig⟩ from client
  send ⟨QUERY, T, cliRsig⟩ to all servers
  wait for replies from n − f servers q of the form
    (A) ⟨⊥, T'⟩ with T' > T and chkStamp(T') or
    (B) ⟨ok, v_q, tl_q, tr_q, cliWsig_q, bindSig_q⟩
      with chkAll(⟨v_q, T, tl_q, tr_q, cliWsig_q, bindSig_q, q⟩)
  if some reply of form (A) then return ⟨⊥, T'⟩
  reps ← {⟨tl_q, tr_q, bindSig_q, q⟩} from replies (B) }
  ⟨tl*, tr*, bindSig*, p*⟩ ← winReply(reps)
  ⟨v*, cliWsig*⟩ ← ⟨v_p*, cliWsig_p*⟩ from replies (B)

send ⟨CERTIFY, v*, T, cliWsig*, reps, cliRsig⟩ to all servers
  wait for replies from n − f servers q of the form
    (A) ⟨⊥, T'⟩ with T' > T and chkStamp(T') or
    (B) ⟨ok, vSig_q⟩ with V_q (vSig_q, ⟨ACK-VAL, v*, T⟩)
  if some reply of form (A) then return ⟨⊥, T'⟩
  valproof ← {⟨q, vSig_q⟩} from the replies of form (B) } send ⟨STORE, v*, tl*, T, cliWsig*, valproof⟩ to all servers
  wait for replies from n − f servers q of the form
    (A) ⟨⊥, T'⟩ with T' > T and chkStamp(T') or
    (B) ⟨ok, sSig_q⟩ with V_q (sSig_q, ⟨ACK-STO, v*, T⟩)
  if some reply of form (A) then return ⟨⊥, T'⟩
  stoproof ← {⟨q, sSig_q⟩} from the replies of form (B) }
  return ⟨ok, v*, stoproof⟩

Initialization
  Tread, Tcert, Tleft, Tright : init-timestamp
  CliWSig : init-sig, Val : init-value upon receive ⟨STORE, v, tl, tr, cliWsig, valproof⟩ from c
  if not chkInter(tl, tr) or not V_client(cliWsig, ⟨WRITE, v, tf⟩) or
     (tl ≠ tr and not chkValProof(v, tr, valproof))
  then return fail
  if tr < max{Tread, Tright} then return ⟨⊥, max{Tread, Tright}⟩
  ⟨Tread, Tleft, Tright, Val, CliWSig⟩ ← ⟨tr, tl, tr, v, cliWsig⟩
  return ⟨ok, S_p(ACK-STO, v, tr)⟩ upon receive ⟨QUERY, T, cliRsig⟩ from c
  if not chkStamp(T) or
     not V_client(cliRsig, ⟨READ, T, c⟩) or Tread = T
  then return fail
  if T < max{Tread, Tright} then return ⟨⊥, max{Tread, Tright}⟩
  Tread ← T
  return ⟨ok, Val, Tleft, Tright, CliWSig, S_p(BIND, T, Tleft, Tright)⟩ upon receive ⟨CERTIFY, v*, T, cliWsig*, reps, cliRsig⟩ from c
  if not chkReps(T, reps) or not V_client(cliWsig, ⟨WRITE, v*, tl*⟩) or
     not V_client(cliRsig, ⟨READ, T, c⟩) or T = Tcert
  then return fail
  if T < max{Tread, Tright, Tcert}
  then return ⟨⊥, max{Tread, Tright, Tcert}⟩
  ⟨Tread, Tcert⟩ ← ⟨T, T⟩
  return ⟨ok, S_p(ACK-VAL, v*, T)⟩ procedure winReply(reps)
  sort reps by 2nd component of tuples, break ties arbitrarily
  candSet ← {largest 2f + 1 tuples in sorted reps}
  if ∃ f + 1 tuples in candSet with same 1st component
  then ⟨tl*, tr*, bindSig*, p*⟩ ← any of these f+1 tuples
  else ⟨tl*, tr*, bindSig*, p*⟩ ← a tuple in candSet with
                                   largest 1st component
  return ⟨tl*, tr*, bindSig*, p*⟩
```

$chkStampTag(T, tagval) \equiv [T \text{ is of form } \langle tag, k, sign \rangle \text{ with } tag = tagval \land \mathcal{V}_{client}(sign, \langle tag, k \rangle)]$ $chkStamp(T) \equiv [T \text{ is of form } \langle tag, k, sign \rangle \text{ with } tag \in \{R\text{-TIME}, W\text{-TIME}\} \land \mathcal{V}_{client}(sign, \langle tag, k \rangle)]$ $chkStoProof(v, T, stoproof) \equiv [\exists Q \subseteq \Pi_s : |Q| = n - f \land stoproof = \cup_{q \in Q} \langle q, sSig_q \rangle \text{ with } \mathcal{V}_q(sSig_q, \langle \text{ACK-STO}, v, T \rangle)]$ $chkInter(I) \equiv [I \text{ is of the form }$
(a) $\langle T, T \rangle$ with $chkStampTag(T, W\text{-TIME})$ or
(b) $\langle tl, tr \rangle$ with $chkStampTag(tl, W\text{-TIME}) \land chkStampTag(tr, R\text{-TIME}) \land tl < tr]$ $chkValProof(v, T, valproof) \equiv [\exists Q \subseteq \Pi_s : |Q| = n - f \land valproof = \cup_{q \in Q} \langle q, vSig_q \rangle \text{ with } \mathcal{V}_q(vSig_q, \langle \text{ACK-VAL}, v, T \rangle)]$ $chkBind(T, tl, tr, bindSig, q) \equiv [chkInter(tl, tr) \land tr < T \land \mathcal{V}_q(bindSig, \langle \text{BIND}, T, tl, tr \rangle)]$ $chkAll(v, T, tl, tr, cliWsig, bindSig, q) \equiv [chkBind(T, tl, tr, bindSig, q \land \mathcal{V}_{client}(cliWsig, \langle \text{WRITE}, v, tl \rangle)]$ $chkReps(T, reps) \equiv [\exists Q \subseteq \Pi_s : |Q| = n - f \land reps = \cup_{q \in Q} \langle tl_q, tr_q, bindSig_q, q \rangle \text{ with } chkBind(T, tl_q, tr_q, bindSig_q, q)]$

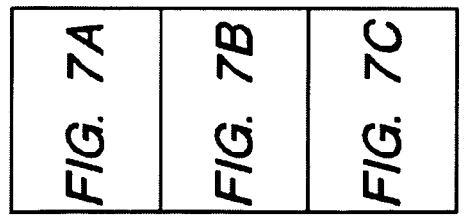

FIG. 7

SYSTEM FOR AND METHOD OF WRITING AND READING REDUNDANT DATA

FIELD OF THE INVENTION

The present invention relates to the field of distributed data storage and, more particularly, to fault tolerant data replication and distributed protocols.

BACKGROUND OF THE INVENTION

Enterprise-class data storage systems differ from consumer-class storage systems primarily in their requirements for reliability. For example, a feature commonly desired for enterprise-class storage systems is that the storage system should not lose data or stop serving data in circumstances that fall short of a complete disaster. To fulfill these requirements, such storage systems are generally constructed from customized, high reliability, hardware components. Their firmware, including the operating system, is typically built from the ground up. Designing and building the hardware components is time-consuming and expensive, and this, coupled with relatively low manufacturing volumes is a major factor in the typically high prices of such storage systems. Another disadvantage to such systems is lack of scalability of a single system. Customers typically pay a high up-front cost for even a minimum disk array configuration, yet a single system can support only a finite capacity and performance. Customers may exceed these limits, resulting in poorly performing systems or having to purchase multiple systems, both of which increase management costs.

It has been proposed to increase the fault tolerance of off-the-shelf or commodity storage system components through and the use of data replication. However, this solution requires coordinated operation of the redundant components and synchronization of the replicated data.

Therefore, what is needed are improved techniques for storage environments in which redundant devices are provided or in which data is replicated. It is toward this end that the present invention is directed.

SUMMARY OF THE INVENTION

The present invention provides a system for and a method of writing and reading redundant data. In accordance with an embodiment of the invention, data is written by storing a copy of the data along with a timestamp and a signature at each of a set of storage devices. The data is read by retrieving the copy of the data, the timestamp and the signature from each of a plurality of the set of data storage devices. One of the copies of the data is selected to be provided to a requester of the data. Each of the storage devices of the set is requested to certify the selected copy of the data. Provided that a proof of certification of the selected copy of the data is valid, the storage devices of the set are instructed to store the selected copy of the data along with a new timestamp.

BRIEF DESCRIPTION OF THE DRAWINGS

The present invention is described with respect to particular exemplary embodiments thereof and reference is accordingly made to the drawings in which:

FIGS. 5A-C illustrate pseudocode for writing and reading data in accordance with an embodiment of the present invention;

FIGS. 7A-C illustrate pseudocode for writing and reading data in accordance with an embodiment of the present invention.

DETAILED DESCRIPTION OF THE INVENTION

The present invention provides improved techniques for storage environments in which redundant storage devices are provided or in which data is replicated. Each storage device may be, but need not be, constructed of commodity components while their operation is coordinated in a decentralized manner. From the perspective of applications requiring storage services, the plurality of storage devices present a single, highly available copy of the data, though the data is replicated. Techniques are provided for accommodating failures and other irregular behaviors, such as malicious security attacks, in a manner that is transparent to applications requiring storage services. A storage device which is the subject of a malicious attack or other circumstance that causes irregular behavior is referred to herein as being "byzantine." A process performed by such a byzantine device is also referred to herein as "byzantine."

Figure 1:
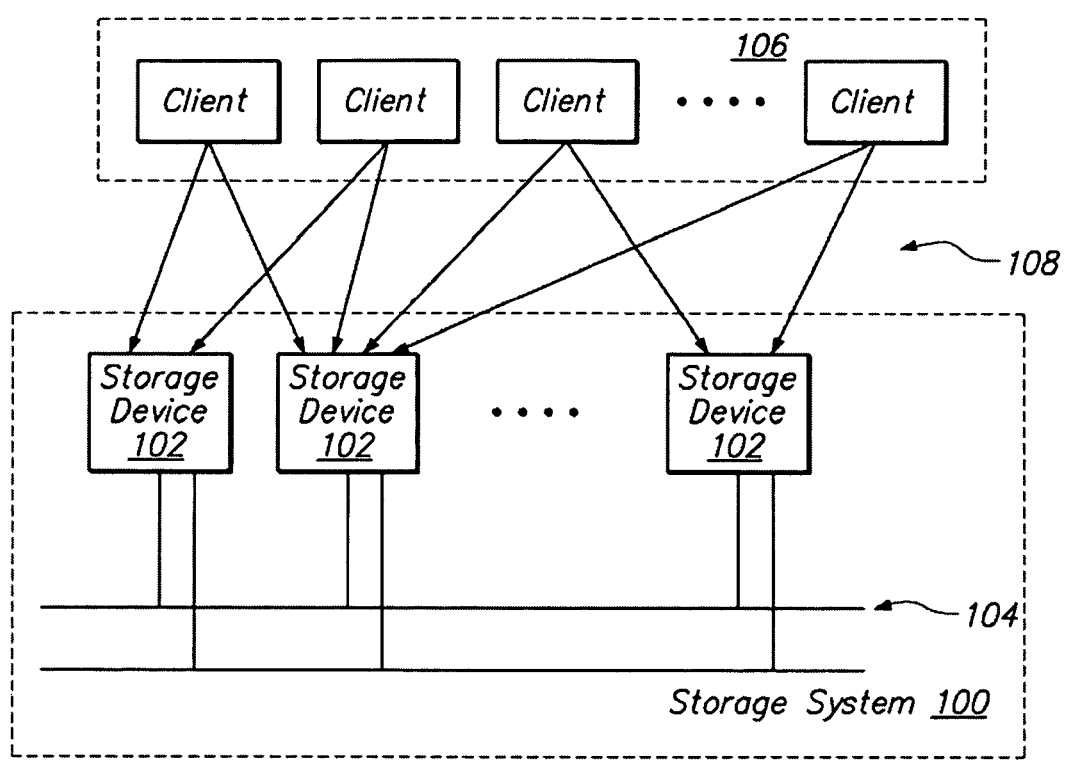
FIG. 1 illustrates an exemplary storage system including multiple redundant storage device nodes in accordance with an embodiment of the present invention.

FIG. 1 illustrates an exemplary storage system 100 including multiple redundant storage devices 102 in accordance with an embodiment of the present invention. The storage devices 102 communicate with each other via a communication medium 104, such as a network (e.g., using Remote Direct Memory Access or RDMA over Ethernet). One or more clients 106 (e.g., servers) access the storage system 100 via a communication medium 108 for accessing data stored therein by performing read and write operations. The communication medium 108 may be implemented by direct or network connections using, for example, iSCSI over Ethernet, Fibre Channel, SCSI or Serial Attached SCSI protocols. While the communication media 104 and 108 are illustrated as being separate, they may be combined or connected to each other. The clients 106 may execute application software (e.g., an email or database application) that generates data and/or requires access to the data.

Figure 2:
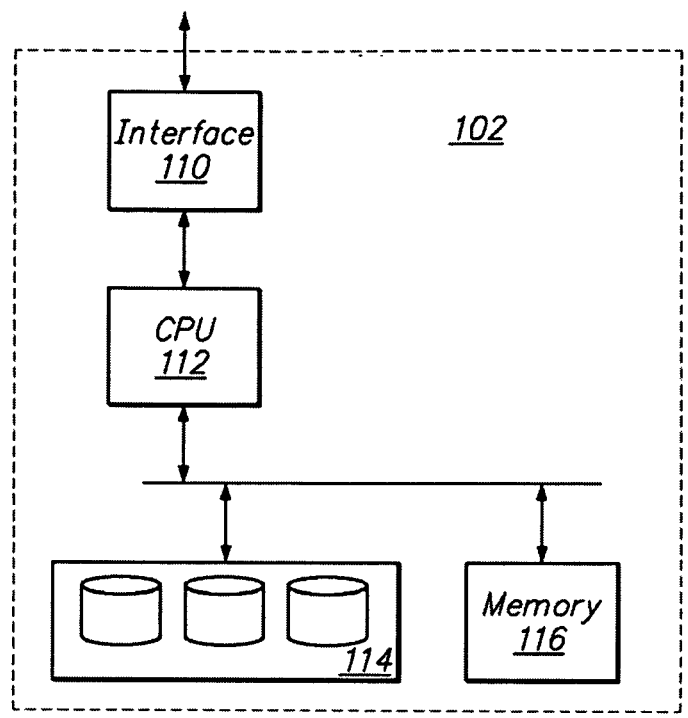
FIG. 2 illustrates an exemplary storage device for use in the storage system of FIG. 1 in accordance with an embodiment of the present invention.

FIG. 2 illustrates an exemplary storage device 102 for use in the storage system 100 of FIG. 1 in accordance with an embodiment of the present invention. As shown in FIG. 2, the storage device 102 may include an interface 110, a central processing unit (CPU) 112, mass storage 114, such as one or more hard disks, and memory 116, which is preferably non-volatile (e.g., NV-RAM). The interface 110 enables the storage device 102 to communicate with other devices 102 of the storage system 100 and with devices external to the storage system 100, such as the clients 106. The CPU 112 generally controls operation of the storage device 102. The memory 116 generally acts as a cache memory for temporarily storing data to be written to the mass storage 114 and data read from the mass storage 114. The memory 116 may also store additional information associated with the data, as explained in more detail herein.

Preferably, each storage device 102 is composed of off-the-shelf or commodity parts so as to minimize cost. I-However, it is not necessary that each storage device 102 is identical to the others. For example, they may be composed of disparate parts and may differ in performance and/or storage capacity.

To provide fault tolerance, data is replicated within the storage system 100. In a preferred embodiment, for each data element, such as a block, an object or a file, at least two different storage devices 102 in the system 100 are designated for storing replicas of the data, where the number of designated storage devices and, thus, the number of replicas, is given as "n." To ensure that the data copies remain consistent, successful read and write operations preferably require participation of at least a majority of the designated devices.

FIGS. 1 and 2 represent physical computer hardware by which the methods described herein can be implemented. For example, software may be tangibly stored in one or more computer-readable media which form a part of the computer hardware of FIGS. 1 and 2. For example, a computer-readable medium may comprise a floppy disk, an optical disk, a magnetic disk or solid state memory, such as RAM, DRAM, or flash memory. Such software, when executed by the computer hardware, causes the hardware to perform the method steps described herein, including the sending and receiving of communications among the storage devices 102 and the clients 106 and the writing and the reading of data to and from the memory 114 and mass storage 116.

Figure 3:
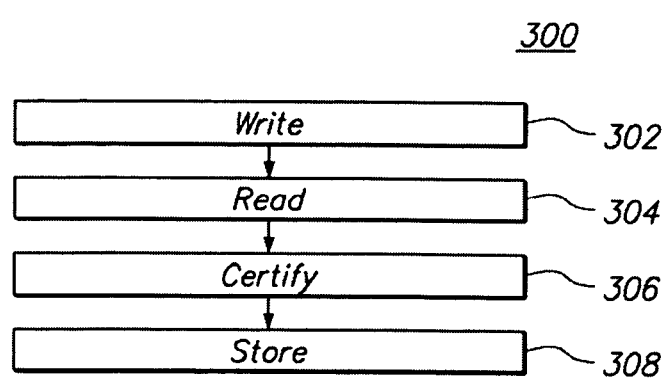
FIG. 3 illustrates a flow diagram of a method of writing and reading data in accordance with an embodiment of the present invention.

FIG. 3 illustrates a flow diagram 300 of a method of writing and reading data in accordance with an embodiment of the present invention. In a step 302, data is written by storing a copy of the data along with a timestamp and a signature at each of a set of storage devices (e.g., the storage devices 102 of FIGS. 1 and 2). The number of devices 102 included in the set is preferably, n, the number of devices designated for storing the data. The timestamp is preferably representative of a current time when the request for writing the data is initiated. For purposes of explanation, the value of the copy of the data may be given as v, while the timestamp may be given as T and the signature may be given as S. As used herein, f is a number of the n storage devices that can be byzantine while the system still writes and reads correctly. Thus, n−f is the number of storage devices needed to conduct read and write operations.

Each storage device 102, given as p, preferably has a pair $(e_p, d_p)$ of public and private keys. In addition, each of the clients 106 has a pair $(e_{client}, d_{client})$ of public and private keys. Further, all processes executing within the system may have access to all of the public keys used within the system. For purposes of explanation, the signature S of message m with key $d_p$ may be given as $S_p(m)$. Further, a verification of a signature S against message m using key $e_p$ may be given as $V_p(s,m)$. In step 302, the message that includes the data value v and the timestamp T is signed by the client 106 that initiated the request. Thus, in step 302, the data v and timestamp T to be stored at each of the storage devices p may be included within a message m, with each message m being signed by a corresponding signature $S_{client}(m)$, with the signature being sent along with the message. It is assumed that byzantine processes cannot break these cryptographic primitives.

In a step 304, at a time after the data v was written, the data is read by retrieving the copy of the data, the timestamp and the signature from each of a plurality of the set of n data storage devices and selecting one of the copies of the data to be provided to a requestor of the data. The copy to be provided to the requestor is selected according to the timestamps and signatures of the retrieved copies. In an embodiment, the copy to be provided to the requestor has the highest timestamp T among those copies that have a valid signature, which indicates that the copy is the most-recently stored valid copy. For purposes of explanation, the selected copy may be given as v*.

In accordance with an embodiment of the present invention, a write or a read request may be received by any one of the storage devices 102 of the storage system 100, and may be initiated by any of the clients 106. The storage device 102 that receives the request acts as the coordinator for the request. While the device that receives the request may also be a designated device for storing the data, this is not necessary. Thus, any of the devices 102 may receive the request. So that each device 102 has information regarding the locations of data within the system 100, each may store, or otherwise have access to, a table of data locations which associates an identification of the data (e.g., a block or file) to identifications of the storage devices 102 designated for storing copies of the data. The coordinator device communicates with the designated devices (and also accesses its own storage if it is also a designated device) for performing the write and read operations described herein.

In a step 306, each or the storage devices of the set is requested to certify the selected copy of the data. To accomplish this, the coordinator may send the signed message that includes the selected copy of the data v* to each of the set of storage devices. The results of this verification (referred to as a proof of certification) may then be communicated from each of the storage devices to the coordinator for the read operation.

In a step 308, provided that the proof of certification of the selected copy of the data is valid, the storage devices of the set are instructed to store the selected copy of the data along with a new timestamp. This may be accomplished by coordinator issuing this instruction along with the selected copy of the data v* and a new timestamp T to each of the n storage devices of the set. This new timestamp T is preferably representative of a current time when the read request is issued by the client 106 in step 304.

Figure 4B:
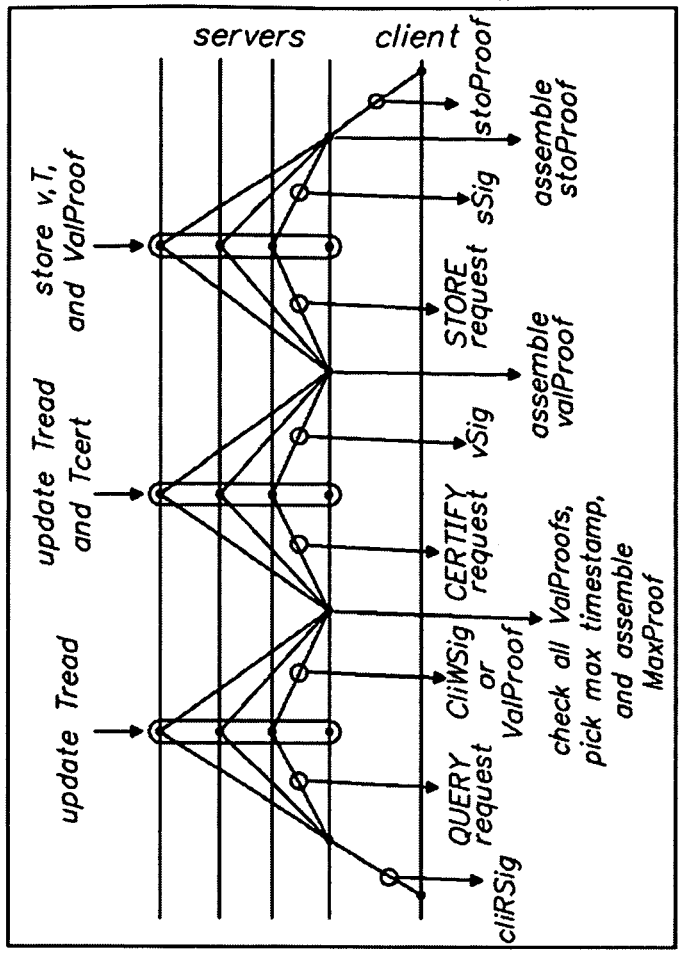
FIGS. 4A and 4B illustrate exemplary timing diagrams for writing and reading data, respectively, in accordance with an embodiment of the present invention.
Figure 4A:
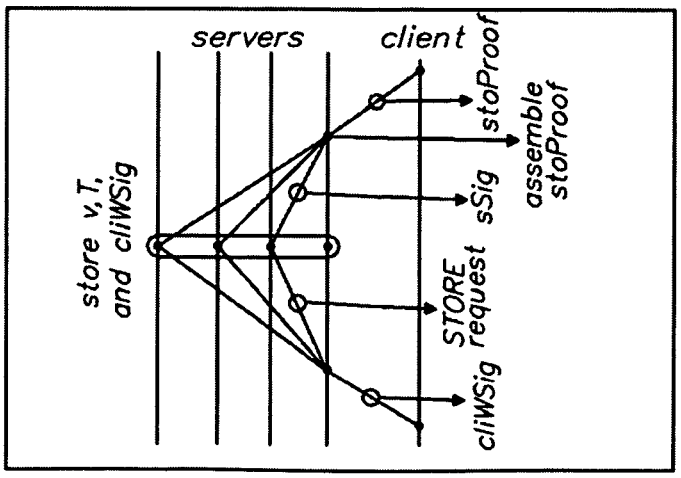

FIG. 4A illustrates an exemplary timing diagram for writing data in accordance with an embodiment of the present invention. As explained above in connection with FIG. 3, a client 106 signs requests issued by the client. This allows the storage devices 102 to execute the requests with confidence that the request was validly originated. In addition, the storage devices 102 preferably sign responses so that the client can verify that its request was fulfilled. For example, to write a data value v to a storage device 102, a client signs a request with the data value v and a timestamp T, and sends it to the coordinator (e.g., in step 302 in FIG. 3). The coordinator then instructs the storage devices 102 to store v and T, attaching the client's signature to a message sent to the storage devices 102. The storage devices 102 store this signature, along with v and T to be used later in reads. It is preferable that the signature is generated from both v and T, not just v, for otherwise a malicious coordinator could overwrite new values with old values. Each storage device 102 may then respond with a signed acknowledgement that it stored v and T, which the coordinator returns to the client 106 as proof of execution of the write operation.

To summarize the write procedure of step 302, the client signs a write request with a data value v and a new timestamp T. The coordinator forwards this request to all storage devices 102 designated for storing the data, who then store (v, T) and the client signature.

FIG. 4B illustrates an exemplary timing diagram for reading the data in accordance with an embodiment of the present invention. The method of reading the data from the storage devices 102 preferably prevents a byzantine process from being able to store an invalid data value with a more-recent timestamp than is associated with the valid copies of the data. To accomplish this, the read operation includes a write-back mechanism (i.e. the store operation of step 308). The write-back mechanism protects against a circumstance referred to herein as a 'pending write.' A pending write occurs when a value is stored only at a minority of the designated storage devices (e.g., because the client and coordinator crashed while the value was being written). In this case, subsequent reads by a different coordinator may return different data, depending on whether the read majority intersects the minority of storage devices with the pending write. The store operation addresses pending writes in two ways. First, if a data value v* with a most-recent timestamp was stored only at a minority of storage devices 102, then that data value is propagated to a majority of the storage devices 102 during the store operation. Second, there could be a pending write of some value (given as $\bar{v}$) with a higher timestamp than the most-recent successful write (this is possible since the coordinator can miss replies from failed storage devices). Such a pending write can cause the write to take effect at a time in the future when some coordinator finally sees the value $\bar{v}$. Writing back v* with a new timestamp (which is larger than $\bar{v}$'s timestamp) during the store operation ensures that $\bar{v}$ will not be picked in a future read. This is referred to herein as 'timestamp promotion' of v*.

The read operation includes three phases, shown by the three triangular 'humps' in FIG. 4B. These three phases correspond to the steps 304, 306 and 308, of FIG. 3, respectively. The read operation may be initiated by a client 106 sending a read request to one of the storage devices 102 which acts as the coordinator. The client 106 preferably obtains and signs a new timestamp and includes it with the request. Then, in a first phase (step 304), the coordinator issues a query to each of the plurality of the set of n data storage devices 102 requesting that each data storage device return its copy of the data v along with its corresponding timestamp T and signature S stored by each storage device. The coordinator then selects the data value v* having a most-recent timestamp T* from among the returned values v that are determined to be valid (we explain this validity determination herein below). So that the correct value is chosen for v* the coordinator preferably ensures that at least n−f replies are returned in response to its query in step 304.

After querying storage devices and picking the value v* with the largest timestamp from among the valid returned values v, the coordinator needs to write back the data value v* with the new timestamp T to the storage devices of the set; however, there is no client signature authorizing such a write-back. More particularly, the client signed the new timestamp T authorizing some to-be-specified write-back with timestamp T, but the client did not have v* so that write-back of v* with timestamp T has not been authorized. To guard against a byzantine coordinator, it is desired to prevent the coordinator from writing back an incorrect value for the data. The certification step 306 helps to guard against this possibility. In an embodiment of the certification step 306, the coordinator sends a message to the client requesting that the client sign a request to write-back v* and the new timestamp T. However, this embodiment requires additional communication between the clients 106 and storage devices 102. To avoid this additional communication, in another embodiment of the certification step 306, the coordinator sends to the set of storage devices the entire set of replies from which v* was picked.

The set of replies may be given as R. Each storage device then validates this write-back by examining the set of replies R and verifying that the coordinator chose v* correctly. To prevent the coordinator from forging the set of replies R, the examining performed by each storage device includes verifying that each of the replies in the set R was signed by a different storage device.

However, if a byzantine coordinator happens to receive more than n−f replies, it could generate two different sets of n−f replies each, such that the data value v* having the most-recent timestamp is different for each set. By doing so, the coordinator can cause different storage devices to write back different values. This situation may be avoided by having the coordinator certify a value-timestamp pair before it is stored at a storage device. At most, one value-timestamp pair can be certified for a given timestamp. This may performed in the certification step 306 as follows:

(1) The coordinator sends R, v* and the new timestamp T to each of the storage devices.
(2) The storage devices check that v* is computed correctly from R and reply with a signed statement including R, v* and T. A non-byzantine storage device signs at most one statement for a given T; to keep track of that, a storage device remembers the largest T used in a statement it previously signed, and it rejects signing statements with smaller or equal timestamps. Timestamps T are preferably signed by clients so that a byzantine storage device cannot cause storage devices to reject signing statements for the largest timestamp.
(3) The coordinator collects signed statements from n−f storage devices into a vector of signatures. This vector is referred to herein as a 'certificate' represented by a variable valproof.

The valproof certificate confirms that v* can be safely promoted to timestamp T. Thus, in step 308, the coordinator attaches the certificate to the write-back request of v*, and each storage device then verifies that the certificate is correct (by determining that all statements refer to v* and T, and they are signed by n−f storage devices). If so, the storage device stores v*, T, and the certificate. The storage device needs to store the certificate so that later, when it replies to a read request, it can prove that its value-timestamp pair (v*, T) is legitimate. In other words, a storage device can either store a data-timestamp pair (v, T) that comes from a write operation, or a data-timestamp pair (v, T) that comes from a write-back operation. In the first case, there is a client signature for (v, T), and in the second case, there is a certificate for (v, T) and there is a client signature on T.

Because each valproof certificate includes n−f signatures, each storage device needs space to store $\theta(n)$ signatures. When a read coordinator queries storage devices, it may receive n−f different certificates, which together have $\theta(n^2)$ signatures.

FIGS. 5A-C illustrate pseudocode for writing and reading data in accordance with an embodiment of the present invention. FIGS. 5A-C show details such as checking the formatting of messages, timestamps, and signatures. The code has three parts. The top part illustrated in FIG. 5A shows code executed by the clients 106. The middle part illustrated in FIG. 5B shows code executed by storage devices 102, including coordinator code (left column), and code for responding to the coordinator (right column). In accordance with the code shown in FIG. 5B: (1) the storage devices use and check signatures throughout, to prevent a byzantine storage device from deviating significantly from the method; and (2) the read coordinator runs a phase to certify a value before it is written back. This certification phase uses a timestamp T to keep track of the largest timestamp certified by a storage device. A storage device refuses to certify smaller timestamps. When a storage device stores a value v with some promoted timestamp T (that is, a timestamp that is not the original one used to write v), it also stores a proof or certificate that the promotion is valid. This certificate is stored in variable valproof. The certificate consists of signed statements from n−f storage devices, each statement containing v and timestamp T. Storing the valproof certificate takes $\theta(n)$ space.

A storage device that stores a value v with its original timestamp T (without promotion) does not store a valproof certificate. This is because there is a client signature on v and T to prove that T is a valid timestamp for v. When a coordinator queries values from each storage device, it needs to check the valproof certificate or the client signature that comes with each value. In the worst case, all storage devices reply with a valproof certificate (instead of a client signature), in which case the coordinator needs to check $\theta(n^2)$ signatures. In an alternative embodiment, explained below, such valproof certificates do not need to be stored.

The bottom part illustrated in FIG. 5C has auxiliary boolean functions used by both clients and storage devices to check messages and signatures. Each function returns whether the check passes. For example, chkValProof (v, T, valproof) checks that a valproof is a correct certificate for v and T, that is, valproof is a set of statements containing v and T signed by n−f storage devices. $\Pi^S$ refers to the set of n storage devices.

In accordance with the embodiments of FIGS. 4A-B and 5A-C, in a system with n storage devices and k clients, up to f<n/3 storage devices can be byzantine and any number of clients can crash while the system can still effectively execute read and write operations. For each operation, a client sends and receives only one message and storage devices check $\theta(n^2)$ signatures.

To summarize the read procedure of FIGS. 4A-B and 5A-C, the client signs a new timestamp T and sends it to the coordinator. The coordinator queries the n storage devices and receives a set of replies with at least n−f of the storage devices replying with a valid client signature or valproof certificate (this step corresponds to step 304 of FIG. 3). The coordinator picks the value v* with highest timestamp (among the values with a valid client signature or valproof certificate), and sends the set of replies, v*, and T to all of the storage devices, who then verify the set of replies, v*, and T, and reply with a signed statement (step 306 of FIG. 3). The coordinator collects n−f properly signed statements to form a valproof certificate and uses the valproof certificate to write back v* with timestamp T. The storage devices store v*, T and valproof (step 308 of FIG. 3).

In accordance with the method described above in connection with FIGS. 4A-B and 5A-C, space required at each storage device is $\theta(n)$ (since a storage device may have to store a certificate with a signature from n−f storage devices) and reading a value may involve checking all the signatures of n−f certificates, for a total of $\theta(n^2)$ signatures. In accordance with an alternative embodiment of a method of writing and reading data (described below in connection with FIGS. 6A-B and 7A-C), the signature usage is reduced. This may be accomplished by the storage devices not storing the certificates and by the read operation not requiring checking certificates. As a result, space at each storage device is $\theta(1)$ and operations check $\theta(n)$ signatures. There is a trade-off: the alternative method of FIGS. 6A-B and 7A-C tolerates up to f<n/4 byzantine storage devices instead of f<n/3, as in the method of FIGS. 4A-B and 5A-C.

Figure 6B:
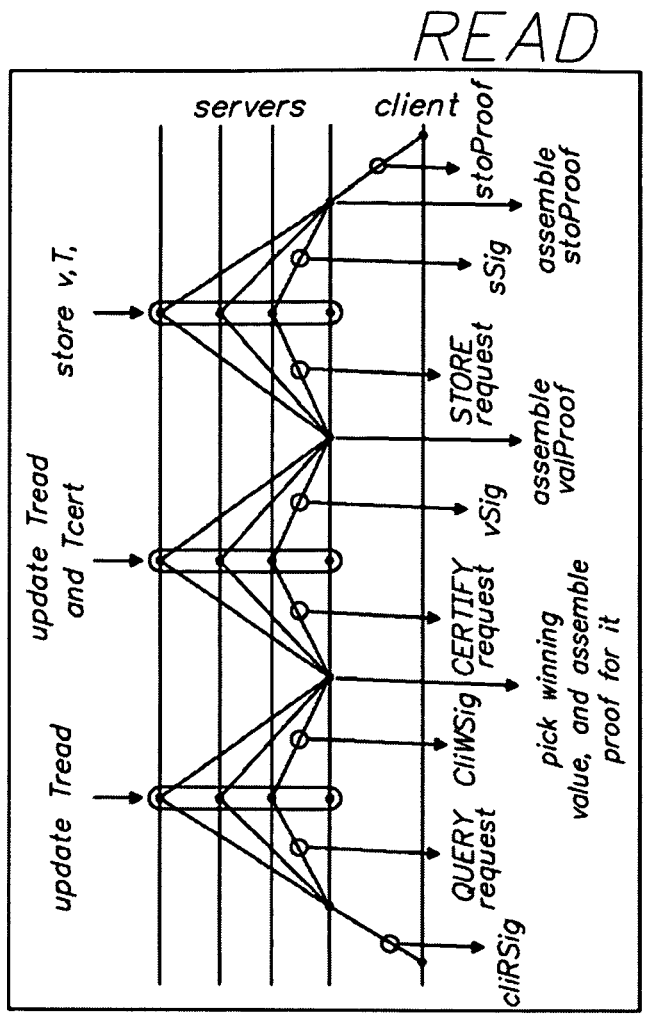
FIGS. 6A and 6B illustrate exemplary timing diagrams for writing and reading data, respectively, in accordance with an embodiment of the present invention.
Figure 6A:
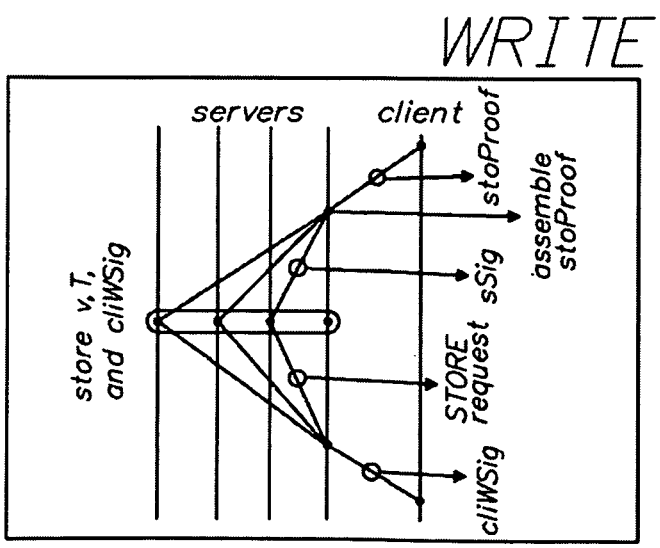

FIGS. 6A and 6B illustrate exemplary timing diagrams for writing and reading data, respectively, in accordance with an alternative embodiment of the present invention. To understand how the alternative method works, consider what might happen to the method described above if storage devices did not keep certificates and read coordinators did not check them. In this case, a byzantine storage device could falsely claim that an old value has been promoted to a new timestamp. If this were to happen, the next read request would return an old value (which was promoted to the highest timestamp), and this would violate linearizability. It appears that this problem might be solved by requiring timestamps to be signed by clients; in this case, however, a client may sign a new timestamp for reading, send this timestamp to a byzantine coordinator, and then crash. Now a byzantine storage device has a signed timestamp, and so the attack described above would still be possible.

The method described above in connection with FIGS. 4A-B and 5A-C solved this problem by using certificates to prevent byzantine storage devices from promoting old values to new timestamps. The alternative method of FIGS. 6A-B and 7A-C employs a new mechanism to select a 'winning value' in a read operation rather than selecting the value with highest timestamp. This alternative mechanism helps to ensure that even if byzantine storage devices promote old values to new timestamps, these values are not picked by a read coordinator, even if the read coordinator cannot tell that these values were maliciously promoted.

Note that there are at most f byzantine storage devices. Therefore, the read coordinator can use the following rule to choose the data value that will be returned from among the values stored at the set of storage devices: Order the data values by timestamp, breaking ties arbitrarily, and discard the top f values, picking the top value that is left as the one to be returned to the requestor. This winning rule is based on the idea that after a value is written or written-back, it is stored with the highest timestamp at n−f storage devices. Later, if f byzantine storage devices try to promote old values to larger timestamps, the (f+1)-th top value is still an uncorrupted value. This mechanism, however, could potentially be defeated under a more sophisticated attack.

Such an attack may be accomplished as follows: (1) Initially, all storage devices hold a value v with timestamp T. (2) Then, a byzantine storage device changes its stored value to some old value $\hat{v}$ but with a new, higher timestamp $\hat{T}>T$. (3) Next, a client requests a write for $v_1$ with timestamp $T_1>T_0$, the request goes to a byzantine coordinator, the coordinator only sends $(v_1, T_1)$ to one non-byzantine storage device, and the client crashes. (4) Similarly for each of values $v_2, \ldots, v_f$, some client requests a write for $v_j$ with timestamp $T_j>T_{j-1}$, the request goes to a byzantine coordinator, the coordinator only sends $(v_j, T_j)$ to a non-byzantine storage device (and the storage device is different for each j), and the client crashes. After all this, f non-byzantine storage devices hold values $v_1, \ldots, v_f$ with timestamps $T_1, \ldots, T_f$, respectively, and one byzantine storage device holds value $\hat{v}$ with timestamp $T_0$. If a read occurs next, the above-described winning-rule incorrectly picks $\hat{v}$ as the value to be returned to the client. But the only acceptable values that could be picked (according to linearizability) is v or one of the $v_j$'s.

An alternative embodiment of the winning rule is the following: Discard data values stored at less than f+1 storage devices; among the data values left, select the one with highest timestamp.

This winning rule is based on the idea that, since there are a maximum of f byzantine storage devices, the above rule discards any maliciously-promoted values that those f storage devices might hold. It appears possible that this rule could end up discarding all values in certain circumstances. This could occur, for example, if a client starts a write, sends its request to byzantine coordinator, which stores the value at a single storage device, and then the client crashes. In this case, each storage device (including non-byzantine ones) could end up with a different value.

Yet another embodiment of the 'winning rule' keeps track of an additional timestamp. Preferably, this is the timestamp used originally to write the value (in step 302). For example, suppose the data value v is first written with timestamp $T_1$ and, later, a write-back promotes v's timestamp to $T_2$. Then, each storage device stores v, $T_1$ and $T_2$. For purposes of explanation, $T_1$ is referred to herein as the 'left' timestamp of v, and $T_2$ is the 'right' timestamp of v. If $T_1$ has not been promoted, then $T_2=T_1$. Note that storage devices need not keep the entire history of timestamps of a value: they preferably only keep the original timestamp (the 'left' timestamp) and the latest promoted timestamp (the 'right' timestamp). For example, if a subsequent write-back promotes v's timestamp to $T_3$, then $T_1$ and $T_3$ are stored, not $T_2$. A 'left' timestamp comes from a previous write operation, and there is a client signature that binds the timestamp to the value v written during the write operation. A 'right' timestamp, if different from the left timestamp, comes from the timestamp promotion in a read operation; there is client signature on the timestamp, but it does not bind it to any data value. Thus, the 'right' timestamp is changed each time the data is read. The left and right timestamps can be combined into a pair $[T_1, T_2]$ or into a triple $[T_1, T_2, v]$, where v is the value bound to $T_1$.

This method may use the following 'winning rule': (1) Among the n−f triples obtained from storage devices, find a set, referred herein as candSet, of 2f+1 triples with the largest right timestamps. Ties may be broken arbitrarily. (2) If some timestamp $T_0$ is the left timestamp of f+1 or more triples in candSet, pick any such triple as the winner. (3) Otherwise, pick the triple in candSet with largest left timestamp. Again, ties may be broken ties arbitrarily.

This winning rule ensures that in any run, if some read or write operation succeeds, resulting in n−2f non-byzantine storage devices storing the same triple $[T_1, T_2, v]$, then afterwards, this winning rule will not select an old, stale value (i.e. one whose left timestamp is less than $T_1$).

Thus, a read returns a relatively recent value, which implies linearizability. Suppose some set $S_1$ of n−2f of non-byzantine storage devices store the same triple $[T_1, T_2, v]$. If a non-byzantine storage device stores a triple $[T'_1, T'_2, v']$ with $T'_2 \geq T_2$ then either $T'_1=T_1$ or $T'_1>T_2$. More particularly, after the set $S_1$ of storage devices store the same triple $[T_1, T_2, v]$, suppose the winning rule is applied for a set $S_2$ of n−f triples (each triple from a different storage device), and consider the candSet computed in accordance with the rule as described above. Then: (1) candSet has at least one triple from a storage device in $S_1$ since candSet has 2f+1 elements; and (2) $S_2$ has at least n−3f elements from $S_1$. Since f<n/4, we have n−3f≧f+1. From this, it follows that $S_2$ has at least f+1 elements from $S_1$, which are all non-byzantine storage devices. There are two cases:

Case 1: Assume that some timestamp $T_0$ is the left timestamp of f+1 or more triples in candSet—as in part (2) of the winning rule. Let goodCandSet be the triples in candSet from non-byzantine storage devices. Since candSet has 2f+1 triples, goodCandSet has at least f+1 triples. Storage devices in $S_1$ cannot replace their right timestamps with a timestamp smaller than $T_2$, since a non-byzantine storage device preferably rejects requests to store right timestamps lower than its own. Thus, goodCandSet has at least f+1 triples with right timestamps equal to $T_2$ or greater. If such a triple has right timestamp greater than $T_2$ then, its left timestamps is either $T_1$ or greater than $T_2$. If such a triple has right timestamp equal to $T_2$ then its left timestamp is equal to $T_1$ (since when a read coordinator is promoting timestamps to $T_2$, it preferably commits to a single value and such a value is v, and the left timestamp of a triple is bound to its value through a client signature). Note that there are at most f triples in candSet that are not in goodCandSet. Therefore, timestamp $T_0$ (the timestamp which is the left timestamp of f+1 or more triples in candSet) is either equal to $T_1$ or it is greater than $T_2$. Thus, the winning rule does not choose a triple whose left timestamp is less than $T_1$.

Case 2: Now assume that no such timestamp $T_0$ exists, i.e., part (3) of the winning rule applies. Thus, candSet has at least one triple from a storage device in $S_1$ (since candSet has 2f+1 elements). Let p be such a storage device. If p changes its triple from $[T_1, T_2, v]$ to something else, then its right timestamp increases, so its left timestamp either remains as $T_1$ or increases beyond $T_2$. Therefore, the largest left timestamp in triples in candSet is at least $T_1$. Thus, the winning rule does not choose a triple whose left timestamp is less than $T_1$.

This shows that if some read or write operation succeeds, resulting in n−2f non-byzantine storage devices storing the same triple $[T_1, T_2, v]$, then afterwards, this winning rule will not select an old, stale value (i.e. one whose left timestamp is less than $T_1$). It is worth noting that this does not hold if the winning rule is changed such that candSet had 2f+2 instead of 2f+1 triples with largest timestamp. This because part (2) of the winning rule could be triggered for a timestamp To smaller than $T_1$.

In accordance with the embodiments of FIGS. 6A-B and 7A-C, in a system with n storage devices and k clients, up to f<n/4 storage devices can be byzantine and any number of clients can crash while the system can still effectively execute read and write operations. For each operation, a client sends and receives only one message and storage devices check θ(n) signatures.

FIGS. 7A-C illustrate pseudocode for writing and reading data in accordance with an embodiment of the present invention. FIGS. 7A-C show details such as checking the formatting of messages, timestamps, and signatures. The code has three parts. The top part illustrated in FIG. 7A shows code executed by client, and it is similar to the method in FIGS. 5A-C. In accordance with FIGS. 7A-C, clients sign timestamps and requests, and they check that the replies are properly signed by storage devices.

The middle part illustrated in FIG. 7B shows code executed by storage devices, including coordinator code (left column), code for responding to the coordinator (right column), and the function with the winning rule (right column). The general structure of the method is similar to that of the method in FIGS. 5A-C. A primary difference, explained in detail above, is the usage of signatures. As in the method of FIG. 5A-C, the read protocol includes a certify phase. Further, the read coordinator uses function winreply to select the winning value. This function is shown on the right column. Each storage device stores its triple $[T_1, T_2, v]$ in variables $T_{l(eft)}$, $T_{r(ight)}$, and Val, respectively. Variable $T_{cert}$ is used for the certify phase: it stores the largest T used in a statement signed by the storage device. Variable $T_{read}$ is stores the largest timestamp seen in a read operation. Variable CliWSig holds a client signature on Val and its timestamp, to prevent forgery of values.

The bottom part illustrated in FIG. 7C has auxiliary boolean functions used by both clients and storage devices to check messages and signatures. Each function returns whether the check passes. For example, chkValProof(v, T, valproof) checks that a valproof is a correct certificate for v and T (i.e., a set of statements containing v and T signed by n–f storage devices).

To summarize the read procedure of FIGS. 6A-B and 7A-C, the client signs a new timestamp T and sends it to the coordinator. The coordinator queries the n storage devices and receives a set of n–f replies, where each reply includes a triple [$T_1$, $T_2$, v] from a storage device (this step corresponds to step 304 of FIG. 3). From these replies, the coordinator identifies a set, referred herein as candSet and picks one of the triples [$T_1$, $T_2$, v] as the winner according to a 'winning rule,' as described above. The coordinator sends the set of replies, the winning data value v*, and T to all of the storage devices, who then verify the set of replies, v*, and T, and reply with a signed statement (step 306 of FIG. 3). The coordinator collects n–f properly signed statements to form a valproof certificate and uses the valproof certificate to write back v* with timestamp T. The storage devices store v*, $T_1$ and T (step 308 of FIG. 3).

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of writing and reading redundant data comprising:
    writing data by storing a copy of the data, along with a timestamp that includes a signature on the copy of the data and on the timestamp, at each of a set of storage devices;
    reading the data by retrieving the copy of the data, the timestamp, and the signature from each of the set of data storage devices and selecting one of the copies of the data to be provided to a requestor of the data;
    requesting each of the storage devices of the set to certify the selected copy of the data, wherein to certify the selected copy of the data includes each of the storage devices of the set verifying that a coordinator device selected the data having a most-recent timestamp and wherein to certify the selected copy includes confirming that each copy of the data includes a signature from a different data storage device of the set of data storage devices; and
    provided that a proof of certification of the selected copy of the data is valid, instructing the storage devices of the set to store the selected copy of the data along with a new timestamp.

2. The method according to claim 1, wherein said instructing the storage devices of the set to store the selected copy of the data along with the new timestamp does not store a new signature in connection with the data.

3. The method according to claim 1, wherein said selecting one of the copies of the data to be provided to the requestor of the data comprises selecting, from among those that are valid, a copy of the data having a highest one of the timestamps retrieved from each of the plurality of the set of data storage devices.

4. The method according to claim 3, wherein the proof of certification comprises a vector of the signatures.

5. The method according to claim 4, wherein each of the storage devices of the set certify the selected copy of the data using the vector of signatures for the data to prove correctness of the selected copy of the data.

6. The method according to claim 3, wherein the storage devices of the set store the proof of certification along with the selected copy of the data.

7. The method according to claim 1, wherein said instructing the storage devices of the set to store the selected copy of the data along with a new timestamp further comprises instructing the storage devices of the set to store the selected copy of the data along with the timestamp associated with the writing of the data.

8. The method according to claim 7, wherein a new timestamp is stored in association with the data each time the data is read.

9. The method according to claim 7, wherein said selecting one of the copies of the data to be provided to a requestor of the data is performed based on the timestamp associated with the writing of the data and the new timestamp.

10. The method according to claim 1, wherein said selecting one of the copies of the data to be provided to a requestor of the data comprises ordering the copies of the data according to the timestamp of each, discarding a number of highest timestamps and selecting the copy of the data having the highest remaining timestamp from among those that are valid.

11. The method according to claim 1, wherein said selecting one of the copies of the data to be provided to a requestor of the data comprises discarding copies of the data stored at less than a determined number of the storage devices, and among the remaining copies of the data, selecting the one having the highest timestamp from among those that are valid.

12. The method according to claim 1, wherein writing the data and reading the data are initiated by one or more client devices coupled to the storage devices.

13. The method according to claim 12, wherein the coordinator device communicates with the one or more client devices and the storage devices for performing the steps of the method.

14. The method according to claim 13, wherein the coordinator device is one of the storage devices of the set of storage devices.

15. The method according to claim 1, wherein the client device initiates the step of writing and wherein the client device generates the signature.

16. The method according to claim 15, wherein the requestor of the data is a second client device and wherein the second client device generates the new timestamp.

17. The method according to claim 15, wherein the client device generates the timestamp.

18. The method according to claim 15, wherein the client device generates the signature by applying a cryptographic key to the data and the timestamp.

19. A non-transitory computer readable medium having stored thereon computer code which, when executed, implements a method of writing and reading redundant data comprising:
    writing data by storing a copy of the data along with a timestamp that includes a signature on the copy of the data and on the timestamp, at each of a set of storage devices;
    reading the data by retrieving the copy of the data, the timestamp and the signature from each of the set of data storage devices and selecting one of the copies of the data to be provided to a requestor of the data;
    requesting each of the storage devices of the set to certify the selected copy of the data, wherein to certify the selected copy of the data includes each of the storage devices of the set verifying that a coordinator device selected the data having a most-recent timestamp and wherein to certify the selected copy includes confirming that each copy of the data includes a signature from a different data storage device of the set of data storage devices; and provided that a proof of certification of the selected copy of the data is valid, instructing the storage devices of the set to store the selected copy of the data along with a new timestamp.

* * * * *